US009703497B2

(12) United States Patent
Higuchi et al.

(10) Patent No.: US 9,703,497 B2
(45) Date of Patent: Jul. 11, 2017

(54) STORAGE SYSTEM AND STORAGE CONTROL METHOD

(71) Applicants: Hitachi, Ltd., Tokyo (JP); Hitachi Information & Telecommunication Engineering, Ltd., Kanagawa (JP)

(72) Inventors: Tomoki Higuchi, Tokyo (JP); Naomitsu Tashiro, Tokyo (JP); Hidehisa Arikawa, Tokyo (JP)

(73) Assignees: Hitachi, Ltd., Tokyo (JP); Hitachi Information & Telecommunications Engineering, Ltd., Kanagawa (JP)

( * ) Notice: Subject to any disclaimer, the term of this patent is extended or adjusted under 35 U.S.C. 154(b) by 301 days.

(21) Appl. No.: 14/427,999

(22) PCT Filed: Jun. 23, 2014

(86) PCT No.: PCT/JP2014/066524
§ 371 (c)(1),
(2) Date: Mar. 13, 2015

(87) PCT Pub. No.: WO2015/198371
PCT Pub. Date: Dec. 30, 2015

(65) Prior Publication Data
US 2016/0259572 A1    Sep. 8, 2016

(51) Int. Cl.
*G06F 3/06*    (2006.01)
*G06F 17/30*   (2006.01)
*G06F 13/24*   (2006.01)

(52) U.S. Cl.
CPC .............. *G06F 3/0619* (2013.01); *G06F 3/06* (2013.01); *G06F 3/064* (2013.01); *G06F 3/065* (2013.01);
(Continued)

(58) Field of Classification Search
CPC ...... G06F 3/064; G06F 3/065; G06F 17/3015; G06F 3/0619
See application file for complete search history.

(56) References Cited

U.S. PATENT DOCUMENTS 8,291,170 B1    10/2012  Zhang et al.
2010/0131480 A1  5/2010  Schneider
(Continued)

FOREIGN PATENT DOCUMENTS

JP    2013-514561 A    4/2013
JP    2013-516679 A    5/2013
(Continued)

OTHER PUBLICATIONS

Written Opinion of the International Searching Authority for International Application No. PCT/JP2014/066524 dated Aug. 26, 2014.

*Primary Examiner* — Glenn A Auve
(74) *Attorney, Agent, or Firm* — Mattingly & Malur, PC

(57) ABSTRACT

In a storage system, a controller prevents the same chunk data from being stored in a storage device in an overlapped manner, on the basis of data block information showing an association of each data block and a plurality of chunk data configuring each data block, chunk group information showing an association of each chunk data not to be overlapped and a chunk group which each chunk data belongs to, and reference data block information showing an association of each chunk group and a data block having any chunk data belonging to each chunk group as constituent elements.

3 Claims, 12 Drawing Sheets

(52) U.S. Cl.
CPC .............. *G06F 3/067* (2013.01); *G06F 13/24* (2013.01); *G06F 17/3015* (2013.01)

(56)     References Cited

U.S. PATENT DOCUMENTS

| | | |
|---|---|---|
| 2011/0167096 A1 | 7/2011 | Guo et al. |
| 2012/0059800 A1 | 3/2012 | Guo |
| 2013/0036277 A1 | 2/2013 | Szczepkowski et al. |

FOREIGN PATENT DOCUMENTS

| | | |
|---|---|---|
| JP | 2013-541083 A | 11/2013 |
| JP | 2013541083 | 11/2013 |
| WO | 2014/087508 A1 | 6/2014 |

Fig. 4

| Data block ID | Chunk group ID | Chunk FP |
|---|---|---|
| DB887 | CG211 | FP557 |
| | CG211 | FP239 |
| | CG211 | FP701 |
| | CG211 | FP491 |
| DB499 | CG211 | FP557 |
| | CG211 | FP239 |
| | CG211 | FP701 |
| | CG211 | FP491 |
| | CG347 | FP113 |
| DB673 | CG211 | FP557 |
| | CG211 | FP239 |
| | CG211 | FP701 |
| | CG211 | FP491 |
| | CG419 | FP269 |
| ... | ... | ... |

Data block table — 200
201, 202, 203
210b

Fig. 5

| Chunk group table (220) ||||
| --- | --- | --- | --- |
| Chunk group ID (221) | Chunk FP (222) | Storage destination of chunk data (223) | Optimization flag (224) |
| CG211 | FP557 | &A | ON |
| | FP239 | &B | ON |
| | FP701 | &C | ON |
| | FP491 | &D | ON |
| CG347 | FP113 | &E | ON |
| CG419 | FP269 | &F | ON |
| ... | ... | ... | ... |

230a points to the CG211 rows.

Fig. 6

| Reference data block table 240 | |
|---|---|
| Chunk group ID 241 | Data block ID 242 |
| CG211 | DB887 |
|  | DB499 |
|  | DB673 |
| CG347 | DB499 |
| CG419 | DB673 |
| CG800 | NULL |
| ... | ... |

250a → CG211 row group
250d → CG419 row

Fig. 7

| Chunk index table 260 | |
|---|---|
| Chunk FP 261 | Chunk group ID 262 |
| FP557 | CG211 |
| FP113 | CG347 |
| FP269 | CG419 |
| ... | ... |

270a

STORAGE SYSTEM AND STORAGE CONTROL METHOD

TECHNICAL FIELD

The present invention relates to storage control. For example, the present invention relates to technology for storage control of data in a storage system.

BACKGROUND ART

Technology of overlap prevention for dividing a data block into a plurality of chunk data and causing the same chunk data not to be stored in storage areas in an overlapped manner, thereby efficiently using the storage areas in a storage system, has been known.

PTL 1 describes technology for managing whether each chunk data is referred to from some place as a reference counter in a file system for performing the overlap prevention and erasing the chunk data when the reference counter becomes "0".

CITATION LIST

Patent Literature

PTL 1: US 2010/0131480

SUMMARY OF INVENTION

Technical Problem

According to the technology described in PTL 1, the number of data blocks in which the chunk data is referred to is only managed as the reference counter. For this reason, if an obstacle occurs during erasing of the data block, the number of data blocks referring to the chunk data actually and the number of reference counter may be mismatched. If such mismatching occurs, a state in which chunk data not referred to from all of the data blocks remains or chunk data being referred to from the data block is erased may be generated.

Accordingly, an object of the present invention is to prevent mismatching from occurring between chunk data and a data block referring to the chunk data.

Solution to Problem

A storage system according to an embodiment of the present invention includes a storage device and a controller to control the storage device.

A plurality of chunk data to be constituent elements of a data block are stored in the storage device.

The controller prevents the same chunk data from being stored in the storage device in an overlapped manner, on the basis of data block information showing an association of each data block and a plurality of chunk data configuring each data block, chunk group information showing an association of each chunk data not to be overlapped and a chunk group which each chunk data belongs to, and reference data block information showing an association of each chunk group and a data block having any chunk data belonging to each chunk group as constituent elements.

Advantageous Effects of Invention

According to the present invention, mismatching can be prevented from occurring between chunk data and a data block referring to the chunk data.

BRIEF DESCRIPTION OF DRAWINGS

FIG. 4 illustrates a configuration example of a data block table.

FIG. 5 illustrates a configuration example of a chunk group table.

FIG. 6 illustrates a configuration example of a reference data block table.

FIG. 7 illustrates a configuration example of a chunk index table.

DESCRIPTION OF EMBODIMENTS

Figure 1:
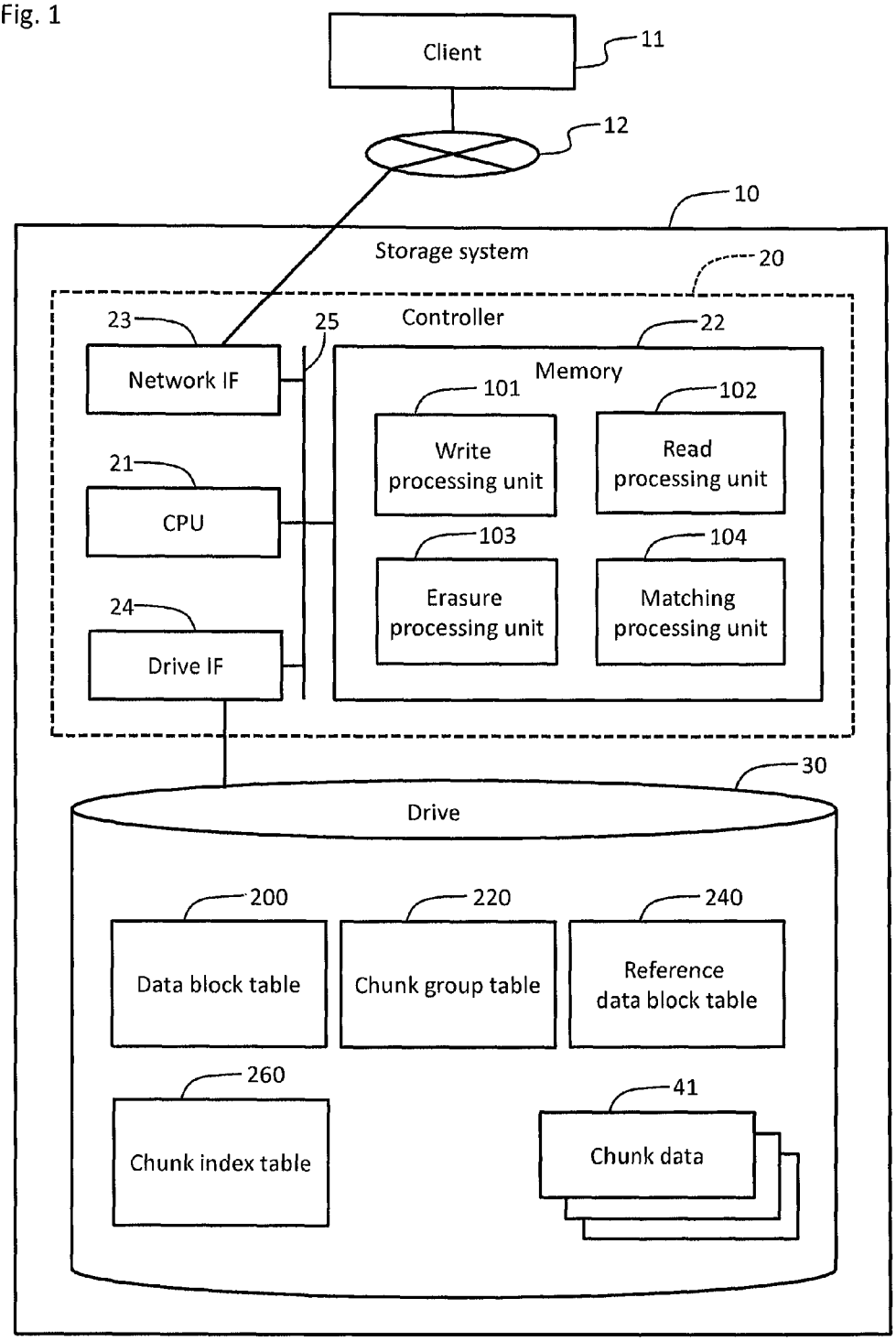
FIG. 1 illustrates a configuration example of a storage system according to this embodiment.

Hereinafter, an embodiment will be described.

In the following description, information is described using an expression of an "xxx table". However, the information may be expressed by any data structure. That is, the "xxx table" can be referred to as "xxx information" to show that the information does not depend on the data structure.

In addition, in the following description, a process is described using an "xxx processing unit" as a subject. However, the processing unit that is a type of computer programs is executed by a processor (for example, a CPU (Central Processing Unit)) to execute a prescribed process while appropriately using at least one of a storage resource (for example, a memory) and a communication interface device. Therefore, the subject of the process may be the processor or an apparatus having the processor. A part or all of processes executed by the processor may be executed by a hardware circuit. A computer program may be installed from a program source. The program source may be a program distribution server or storage media (for example, portable storage media).

In addition, in the following description, when the same types of elements are distinguished from each other and are described, reference numerals may be used like "xxx250a" and "xxx250b" and when the same types of elements are not distinguished from each other and are described, only a common number of the reference numerals may be used like "xxx250".

FIG. 1 illustrates a configuration example of a storage system 10 according to this embodiment.

The storage system 10 is coupled to a client 11 through a communication network 12 and stores data according to a write request from the client 11 or transmits the stored data to the client 11 according to a read request from the client 11. The client 11 may be a so-called electronic computer. As the communication network 12, a storage area network (SAN), a local area network (LAN), or a combination of the SAN or the LAN and an Internet network is exemplified.

The storage system 10 includes a CPU 21, a memory 22, a network interface (IF) 23, a drive IF 24, and a drive 30, which are coupled by a bus 25 that enables bidirectional data transmission and reception.

The CPU 21 manages a computer program and data stored in the memory 22 and realizes various functions regarding the storage system 10. The CPU 21 processes I/O with the client 11 through the network IF 23 or processes I/O with the drive through the drive IF 24. As the memory 22, dynamic random access memory (DRAM) or magnetoresistive random access memory (MRAM) is exemplified. Hereinafter, the CPU 21, the memory 22, the network IF 23, and the drive IF 24 may be collectively referred to as a controller 20.

In the drive 30, data is stored. As the drive 30, a hard disk drive (HDD) or a solid state drive (SSD) is exemplified. Data read and written from the client 11 and a variety of information used by the controller 20 are stored in the drive 30.

The controller 20 divides a data block according to a write request into one or more chunk data, prevents the same chunk data from being stored in an overlapped manner, and stores each chunk data in the drive 30. This is to efficiently use a capacity of the drive 30. This is referred to as "overlap prevention".

The drive 30 has various tables 200, 220, 240, and 260 to manage the overlap prevented chunk data.

The data block table 200 has information showing an association of each data block 40 and a plurality of chunk data 41 configuring each data block. The data block table 200 will be described in detail below (refer to FIG. 4).

The chunk group table 220 has information showing an association of each chunk data 41 not to be overlapped and a chunk group 60 to which each chunk data 41 belongs. The chunk group table 220 will be described in detail below (refer to FIG. 5).

The chunk index table 260 has information showing which chunk group 60 the chunk data 41 belongs to. The chunk index table 260 will be described in detail below (refer to FIG. 7).

The reference data block table 200 has information showing an association of each chunk group 60 and the data block 40 using any chunk data 41 belonging to each chunk group 60 as a constituent element. The reference data block table 200 will be described in detail below (refer to FIG. 6). The storage system 10 according to this embodiment has the reference data block table 200 and a storage system according to a comparative example to be described below does not have the reference data block table 200.

The controller 20 has a write processing unit 101, a read processing unit 102, an erasure processing unit 103, and a matching processing unit 104 as types of computer programs.

The write processing unit 101 executes a process for writing the data block according to the write request transmitted from the client 11 to the drive 30. At this time, the write processing unit 101 divides the data block into one or more chunk data and writes each chunk data not to be overlapped in the drive 30. That is, the write processing unit 101 associates the data block according to the write request with the chunk group which the same chunk data belongs to in the reference data block table 240, for the chunk data of one or more divided chunk data, in which the same chunk data is stored in the drive 30. In addition, the controller may not store the actual chunk data in the drive 30. Thereby, the same chunk data can be prevented from being stored in the drive 30 in an overlapped manner. According to this, the write processing unit 101 changes the various tables 200, 220, 240, and 260 to manage overlapping of the chunk data. The write processing unit 101 will be described in detail below.

The read processing unit 102 executes a process for reading the data block according to the read request transmitted from the client 11 from the drive 30. At this time, the read processing unit 102 refers to the various tables 200, 220, 240, and 260 and reconfigures the data block from one or more chunk data.

The erasure processing unit 103 executes a process for erasing a data block according to an erasure request transmitted from the client 11 from the drive 30. That is, the erasure processing unit 103 erases an association of a data block of an erasure target from the chunk group which the data block of the erasure target is associated with, in the reference data block table 240. In addition, when there is a chunk group (that is, a chunk group of which an association number is "0") not associated with all data blocks in the chunk groups which the data block of the erasure target is associated with, in the reference data block table 240, the erasure processing unit 103 erases the chunk data belonging to the chunk group from the drive 30. This is because the chunk data belonging to the chunk group is not referred to from all of the data blocks and is unnecessary. According to this, the erasure processing unit 102 changes the various tables 200, 220, 240, and 260.

The erasure processing unit 103 may hold at least partial records of the reference data block table 240 on the memory 22 having an I/O speed faster than that of the drive 30, change the records on the memory 22 in the erasure process, and reflect the records changed on the memory 22 at predetermined timing in the reference data block table 240 of the drive 30. That is, the erasure processing unit 103 may return a completion response to the client 11 asynchronously with the actual erasure process, for the erasure request from the client 11. As such, even when the asynchronous process is executed, the storage system 10 according to this embodiment can prevent mismatching from occurring between the chunk data and the various data stored in the drive 30, as described below. The erasure processing unit 102 will be described in detail below.

The matching processing unit 104 executes a process for confirming whether mismatching does not occur between the various tables 200, 220, 240, and 260 and the chunk data stored in the drive 30 and modifying the mismatching when the mismatching occurs. That is, when there is a data block not included in the data block table 200 in the reference data block table 240, the matching processing unit 104 erases the association of the data block. At this time, the matching processing unit 102 may erase the chunk data becoming unnecessary from the drive 30. The matching processing unit 104 may be executed when the erasure process by the erasure processing unit 103 is interrupted by sudden power outage. The matching processing unit 104 will be described in detail below.

Figure 2:
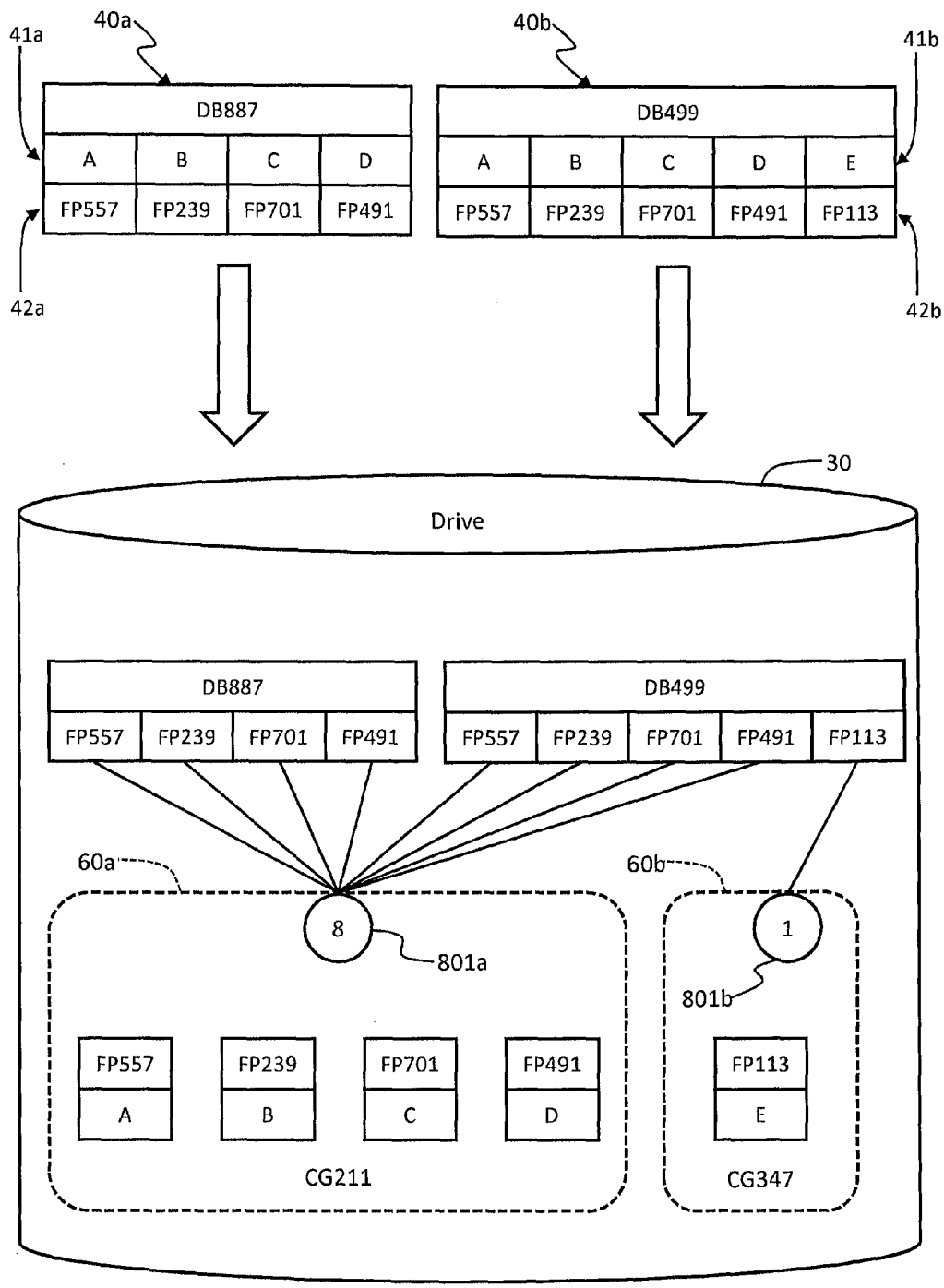
FIG. 2 is a diagram illustrating an outline of an overlap prevention process of a storage system according to a comparative example.

FIG. 2 is a diagram illustrating an outline of an overlap prevention process in a storage system according to a comparative example.

When a controller according to the comparative example receives a data block 40a "DB887" according to a write request from a client, the controller executes the following process.

(S11) The controller divides the data block 40a "DB887" into chunk data 41a (A, B, C, and D) having predetermined sizes and calculates chunk FPs 42a (FP557, FP239, FP701, and FP491) corresponding to the individual chunk data. Here, the chunk FP is a finger print corresponding to the chunk data and is a hash value calculated from the chunk data, for example.

(S12) The controller confirms whether the same chunk FP as each chunk FP 42a exists in the drive 30. Here, because the same chunk FP as each chunk FP 42a does not exist in the drive 30, the controller executes the following process.

(S13) The controller generates a new chunk group 60a (CG211) to cause the chunk FP 42a to belong to.

(S14) The controller causes the chunk FPs 42a (FP557, FP239, FP701, and FP491) to belong to the new chunk group 60a (CG211).

(S15) The controller associates the data block 40a (DB887), the chunk FPs 42a (FP557, FP239, FP701, and FP491) corresponding to the chunk data 41a (A, B, C, and D) divided from the data block 40a, and the chunk group 60a (CG211) which the individual chunk FPs 42a belong to and registers the association in the data block table.

(S16) The controller associates the newly generated chunk group 60a (CG211), the chunk FPs 42a (FP557, FP239, FP701, and FP491) belonging to the chunk group 60a, the chunk data 40a (A, B, C, and D) corresponding to the chunk FPs 42a, and a total number (referred to as a "total reference number") 801a of data blocks referring to each of the chunk data 40a (A, B, C, and D) and registers the association in the chunk group table. The total reference number 801a shows a total number of data blocks 40a (DB887) referring to the individual chunk data 41a (A, B, C, and D) belonging to the chunk group 60a (CG211). In the case of this comparative example, because the chunk data 14a "A", "B", "C", and "D" are referred to from the data blocks 40a (DB887), the total reference number 801a becomes "4".

In this situation, when the controller according to the comparative example receives the data block 40b (DB499) regarding the write data from the client, the controller executes the following process.

(S21) The controller divides the data block 40b (DB499) into chunk data 41b (A, B, C, D, and E) having the predetermined sizes and calculates chunk FPs 42b (FP557, FP239, FP701, FP491, and FP113) corresponding to the individual chunk data.

(S22) The controller confirms whether the same chunk FP exists in the drive 30, for each chunk FP 42b. Here, because the same chunk FPs as the partial chunk FPs (FP557, FP239, FP701, and FP491) exist in the drive 30, the controller executes the following process.

(S23) The controller specifies the chunk group 60a (CG211) which the same chunk FPs (FP557, FP239, FP701, and FP491) belong to. In addition, the controller generates a new chunk group 60b (CG347) to cause the chunk FP (FP113) in which the same chunk FP does not exist in the drive 30 to belong to.

(S24) The controller associates the data block 40b (DB499), the chunk FPs (FP557, FP239, FP701, and FP491) in which the same chunk FPs exist in the drive 30, and the chunk group 60a (CG211) which the individual chunk FPs belong to and registers the association in the data block table. In addition, the controller associates the data block 40b (DB499), the chunk FPs 42b (FP113) in which the same chunk FPs do not exist in the drive 30, and the chunk group 60b (CG347) which the chunk FPs 42b belong to and registers the association in the data block table.

(S25) The controller updates the total reference number 801a regarding the existing chunk group 60a (CG211). That is, because the chunk data A, B, C, and D are referred to by the data blocks 40b (DB499), the controller updates the total reference number 801a from "4" to "8". In addition, the controller associates the newly generated chunk group 60b (CG347), the chunk FPs 42b (FP113) belonging to the chunk group 60b, the chunk data 41b (E) corresponding to the chunk FP 42b (FP113), and the total reference number 801b ("1") of the chunk data (E) and registers the association in the chunk group table.

In this situation, when the data block 40b (DB499) is erased, the controller according to the comparative example executes the following process.

(S31) The controller causes the data block 40b (DB499) not to be inaccessible from the client.

(S32) The controller refers to the data block table and sequentially executes the following processes S33 to S35 for the individual chunk FPs 42b (FP557, FP239, FP701, FP491, and FP113) corresponding to the data block 40b (DB499). Here, the chunk FP of each process target is referred to as the "target chunk FP".

(S33) The controller specifies the chunk group 60a (CG211) which the target chunk FP (for example, FP557) belongs to, from the chunk group table.

(S34) The controller subtracts "1" from the total reference number 801a corresponding to the chunk group 60a (CG211).

(S35) The controller returns to S31 and executes the process for a next target chunk FP (for example, FP239).

(S36) If the processes of S33 to S35 are executed for all of the chunk FPs (FP557, FP239, FP701, FP491, and FP113) corresponding to the data block 40b (DB499), the total reference number 801a of the chunk group 60a (CG211) becomes "4" and the total reference number 801b of the chunk group 60b (CG347) becomes "0". Therefore, the controller 20 erases the chunk FP (FP113) and the chunk data (E) belonging to the chunk group 60b (CG347) of which the total reference number has become "0". The reason why the total reference number is "0" is that all of the chunk data belonging to the chunk group are not referred to from all of the data blocks and are determined as unnecessary chunk data.

However, the erasure process according to the comparative example has the following problems.

(1) During the erasure process, when sudden power outage or obstacle occurs and the erasure process is interrupted, the controller cannot determine a progression degree of the erasure process, even though the controller retries the erasure process. For example, it is assumed that the interrupt occurs when the erasure process is executed to the chunk FP "FP557" and "FP239", in the erasure process of the data block 40b (DB499). In this case, the data block 40b becomes already inaccessible and the total reference number 801a of the chunk group 60a (CG211) becomes "6" and the total reference number 801b of the chunk group 60b (CG347) becomes "1". That is, the chunk FP "FP113" and the chunk data "E" belonging to the chunk group 60b (CG347) cannot be erased because the total reference number 801b is "1", though the chunk FP "FP113" and the chunk data "E" are not referred to from all of the data blocks. In addition, even when the data block 40a (DB887) is erased, the chunk FP and the chunk data belonging to the chunk group 60a (CG211) cannot be erased because the total reference number 801a is "2", though the chunk FP and the chunk data are not referred to from all of the data blocks. That is, if the erasure process is interrupted, mismatching of the total reference number occurs and a situation where the chunk data to be erased cannot be erased may be generated.

(2) The following state may be generated. That is, when the first data block includes chunk data "A" and "B" and the second data block includes chunk data "A", "B", and "A", the total reference number of the chunk data "A" becomes "3" and the total reference number of the chunk data "B" becomes "2". When the second data block (A, B, A) is normally erased, the total reference numbers of the chunk data "A" and "B" become "1" and "1", respectively. However, when the total reference numbers of the chunk data "A" and "B" are "2" and "2", respectively, during the erasure process of the second data block, sudden power outage or obstacle occurs and the erasure process is interrupted. In this case, the controller retries the erasure process of the second data block (A, B, A) from a state in which the total reference numbers of the chunk data "A" and "B" are "2" and "2", respectively. Then, though the chunk data "A" is referred to from the first chunk data, the total reference numbers of the chunk data "A" and "B" become "0" and "1", respectively, and mismatching of the total reference numbers 801 may occur.

Therefore, in described in (1) and (2), when the erasure process is interrupted, the controller needs to confirm matching of the total reference number 801, before retrying the erasure process. In order to confirm matching of the total reference number 801, it is necessary to confirm which chunk group which chunk data belongs to, for each of the entire data blocks registered in the data block table, and modify the total reference number 801. However, because the number of chunk data stored in the drive 300 is very large in general, a very long time is necessary when the process is executed.

(3) When the controller receives the erasure request from the client, the controller executes the actual erasure process asynchronously after returning a response to the erasure request. In the erasure process, the controller develops all or a part of the various tables stored in the drive 30 to a memory, changes the tables on the memory, and reflects the change in the tables of the drive 30. This is to enhance response performance of the storage system. However, when the erasure process is interrupted in the middle of the process on the memory, mismatching of the total reference number 801 may occur, similar to (1) and (2) described above.

Figure 3:
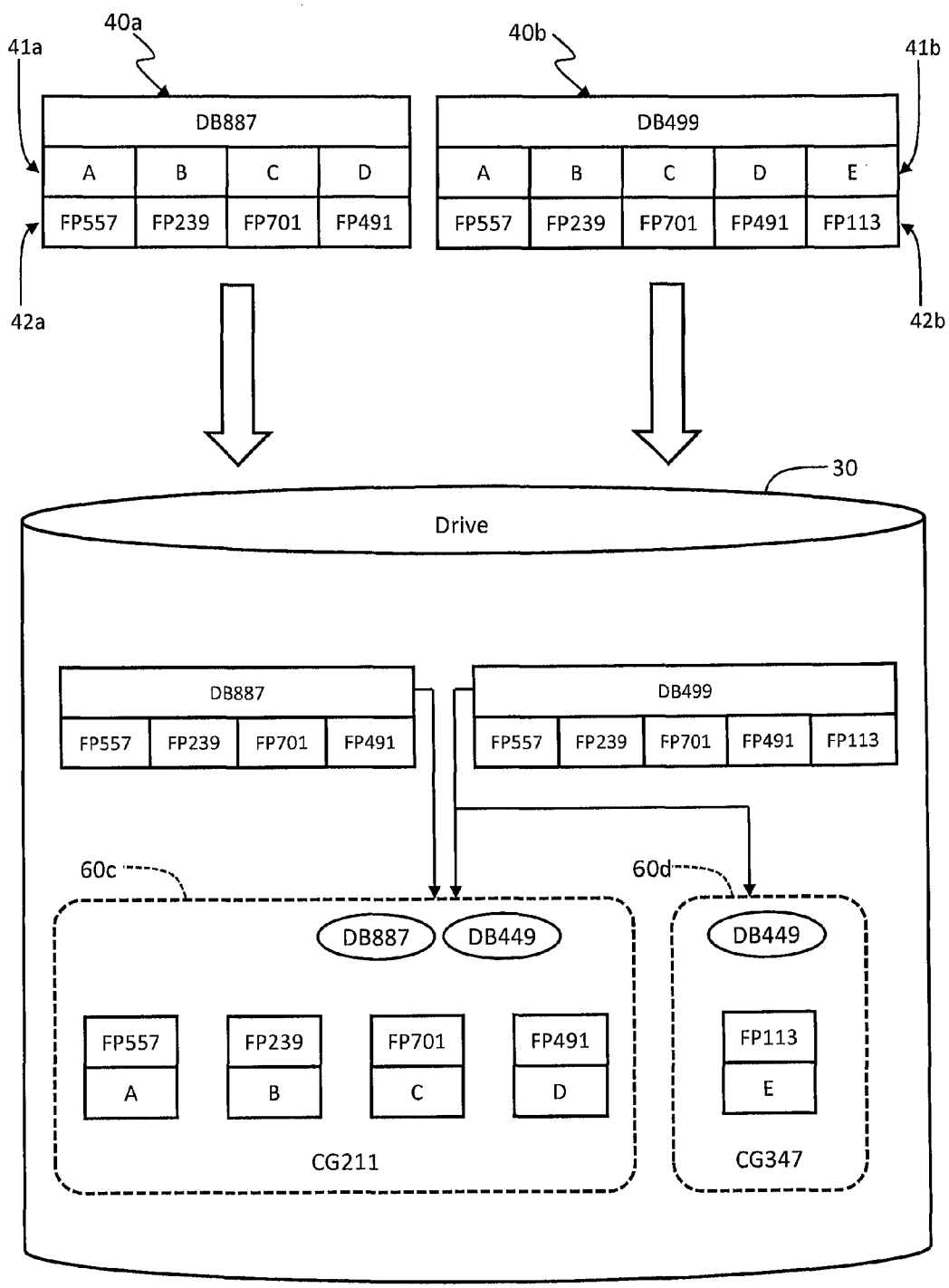
FIG. 3 is a diagram illustrating an outline of an overlap prevention process of the storage system according to this embodiment.

FIG. 3 is a diagram illustrating an outline of an overlap prevention process in the storage system 10 according to this embodiment.

When the controller 20 according to this embodiment receives the first data block (DB887) according to the write request from the client 11, the controller 20 executes the following process.

(S41) The controller 20 divides the data block 40a (DB887) into chunk data 41a (A, B, C, and D) having predetermined sizes and calculates chunk FPs 42a (FP557, FP239, FP701, and FP491) corresponding to the individual chunk data.

(S42) The controller 20 confirms whether the same chunk FP as each chunk FP 42a exists in the drive 30. Here, because the same chunk FP as each chunk FP 42a does not exist in the drive 30, the controller 20 executes the following process.

(S43) The controller 20 generates a new chunk group 60c (CG211) to cause the chunk FP 42a to belong to.

(S44) The controller 20 causes the chunk FPs 42a (FP557, FP239, FP701, and FP491) to belong to the new chunk group 60c (CG211).

(S45) The controller 20 associates the data block 40a (DB887), the chunk FPs 42a (FP557, FP239, FP701, and FP491) corresponding to the chunk data 41a (A, B, C, and D) divided from the data block 40a, and the chunk group 60c (CG211) which the individual chunk FPs 42a belong to and registers the association in the data block table 200.

(S46) The controller 20 associates the newly generated chunk group 60c (CG211), the chunk FPs 42a (FP557, FP239, FP701, and FP491) belonging to the chunk group 60c, and the chunk data 41a (A, B, C, and D) corresponding to the chunk FPs 42a (FP557, FP239, FP701, and FP491) and registers the association in the chunk group table 220.

(S47) The controller 20 associates the chunk group 60c (CG211) which the new chunk data 41a (A, B, C, and D) configuring the data block 40a (DB887) belongs to and the data block 40a (DB887) and registers the association in the reference data block table 240.

In this situation, when the controller 20 according to this embodiment receives the data block 40b (DB499) according to the write request from the client 11, the controller 20 executes the following process.

(S51) The controller 20 divides the data block 40b (DB499) into the chunk data 41b (A, B, C, D, and E) having the predetermined sizes and calculates the chunk FPs 42b (FP557, FP239, FP701, FP491, and FP113) corresponding to the individual chunk data.

(S52) The controller 20 confirms whether the same chunk FP exists in the drive 30, for each chunk FP 42b. Here, because the same chunk FPs as the partial chunk FPs (FP557, FP239, FP701, and FP491) exist in the drive 30, the controller 20 executes the following process.

(S53) The controller 20 specifies the chunk group 60c (CG211) which the same chunk FPs (FP557, FP239, FP701, and FP491) belong to. In addition, the controller 20 generates a new chunk group 60d (CG347) to cause the chunk FP (FP113) in which the same chunk FP does not exist in the drive 30 to belong to.

(S54) The controller 20 associates the data block 40b (DB499), the chunk FPs (FP557, FP239, FP701, FP491, and FP113) in which the same chunk FPs exist in the drive 30, and the chunk group 60c (CG211) which the individual chunk FPs belong to and registers the association in the data block table 200. In addition, the controller 20 associates the data block 40b (DB499), the chunk FPs (FP113) in which the same chunk FPs do not exist in the drive 30, and the chunk group 60b (CG347) which the chunk FPs belong to and registers the association in the data block table 200.

(S55) The controller 20 associates the newly generated chunk group 60d (CG347), the chunk FP (FP113) belonging to the chunk group 60d (CG347), and the chunk data (E) corresponding to the chunk FP (FP113) and registers the association in the chunk group table 220.

(S56) The controller 20 associates the chunk group 60c (CG211) which the chunk FPs (FP557, FP239, FP701, FP491, and FP113) in which the same chunk FPs exist in the drive 30 belong to and the data block 40b (DB499) and registers the association in the reference data block table 240. In addition, the controller 20 associates the newly generated chunk group 60*d* (CG347) and the data block 40*b* (DB499) and registers the association in the reference data block table 240.

In this situation, when the controller 20 according to this embodiment erases the data block 40*b* (DB499), the controller 20 executes the following process.

(S61) The controller 20 causes the data block (DB499) to be inaccessible from the client 11.

(S62) The controller 20 erases the associations of all of the data blocks (DB499) from the reference data block table 240.

(S63) If the process of S62 is executed for all of the chunk FPs 42*b* (FP557, FP239, FP701, FP491, and FP113) configuring the data block (DB499), the association of the data block (DB499) from the chunk group "CG347" is erased in the reference data block table 240. That is, there is no data block associated with the chunk group "CG347". Therefore, the controller 20 refers to the chunk group table 220, specifies the chunk FP (FP113) and the chunk data (E) belonging to the chunk group "CG347" not associated with all of the data blocks, and erases the chunk FP and the chunk data from each table and the drive 30. In the reference data block table 240, the chunk data belonging to the chunk group not associated with all of the data blocks is not referred to from all of the data blocks and is determined as unnecessary chunk data.

According to the erasure process according to this embodiment, the following function and effect can be achieved.

(1) In the comparative example, it is necessary to execute the process for each chunk data configuring the data block of the erasure target. However, in this embodiment, the process may be executed for each data block. That is, in this embodiment, time necessary for the erasure process can be decreased.

(2) Even when the erasure process is interrupted, the storage system 10 according to this embodiment searches the data block not existing in the data block table 200 from the reference data block table 240 and determines a progression degree of the erasure process.

(3) In this embodiment, in the matching process after the erasure process is interrupted, because matching may be confirmed according to the number of data blocks, a matching process time can be decreased as compared with the case in which the matching is confirmed for each chunk data, like the comparative example.

FIG. 4 illustrates a configuration example of the data block table 200.

The data block table 200 is a table to manage which chunk data 41 each data block 40 is configured by. The data block table 200 has a record 210 to associate a data block ID 201 and one or more chunk group IDs 202 and associate each chunk group ID 202 and a chunk FP 203.

The data block ID 201 is information to identify the data block 40.

The chunk group ID 202 is information to identify the chunk group 60.

The chunk FP 203 is information to identify the chunk data 41 and is a hash value calculated from the chunk data 41, for example.

For example, a record 210*b* in FIG. 4 shows that the data block (201) "DB499" includes chunk data 41 corresponding to chunk FPs (203) "FP557", "FP239", "FP701", "FP491", and "FP113", the chunk FPs (203) "FP557", "FP239", "FP701", and "FP491" belong to the chunk group (202) "CG211", and the chunk FP (203) "113" belongs to the chunk group (202) "CG347".

FIG. 5 illustrates a configuration example of the chunk group table 220.

The chunk group table 220 is a table to manage which chunk group 60 each chunk data 41 belongs to. The chunk group table 220 has a record 230 to associate a chunk group ID 221 and one or more chunk FPs 222 and associate each chunk FP 222, a storage destination 223 of chunk data, and an optimization flag 224. The chunk group ID 221 and the chunk FP 222 are as described above.

The storage destination 223 of the chunk data shows a place where the chunk data 41 corresponding to the chunk FP 222 is stored. For example, the storage destination 223 of the chunk data is a logical address at which the chunk data 41 is stored in a storage area of the drive 30.

The optimization flag 224 is information used for the matching process to be described below. When the matching process is not executed, the chunk group table 220 may not have an item of the optimization flag 224.

For example, a record 230*a* in FIG. 5 shows that the chunk FPs (222) "FP557", "FP239", "FP701", and "FP491" belong to the chunk group (221) "CG211", the chunk data corresponding to the individual chunk FPs are stored in places shown by logical addresses "&A", "&B", "&C", and "&D", and the optimization flags (224) of all of the chunk FPs (22) are "ON".

FIG. 6 illustrates a configuration example of the reference data block table 240.

The reference data block table 240 is a table to manage which data block 40 each chunk group 60 is referred to from. The reference data block table 240 has a record 250 to associate a chunk group ID 241 and one or more data block IDs 242. The chunk group ID 241 and the data block ID 242 are as described above.

For example, a record 250*a* in FIG. 6 shows that the chunk data (chunk FPs) belonging to the chunk group (241) "CG211" are referred to from the data blocks (242) "DB887" "DB449", and "DB673".

For example, a record 250*d* in FIG. 6 shows that all of the chunk data (chunk FPs) belonging to the chunk group (241) "CG800" are not referred to from all of the data blocks (242) (NULL). In this case, the controller 20 determines that all of the chunk data (chunk FPs) belonging to the chunk group "CG800" can be erased.

FIG. 7 illustrates a configuration example of the chunk index table 260.

The chunk index table 260 is a table to manage which chunk group 60 each chunk FP 42 belongs to. The chunk index table 260 is used to search the chunk group which the chunk FP belongs to at a high speed. The chunk index table 260 has a record 270 to associate a chunk FP 261 and a chunk group ID 262. The chunk FP 261 and the chunk group ID 262 are as described above.

For example, a record 270*a* in FIG. 7 shows that a chunk FP (261) "FP557" belongs to the chunk group (262) "CG211".

Figure 8:
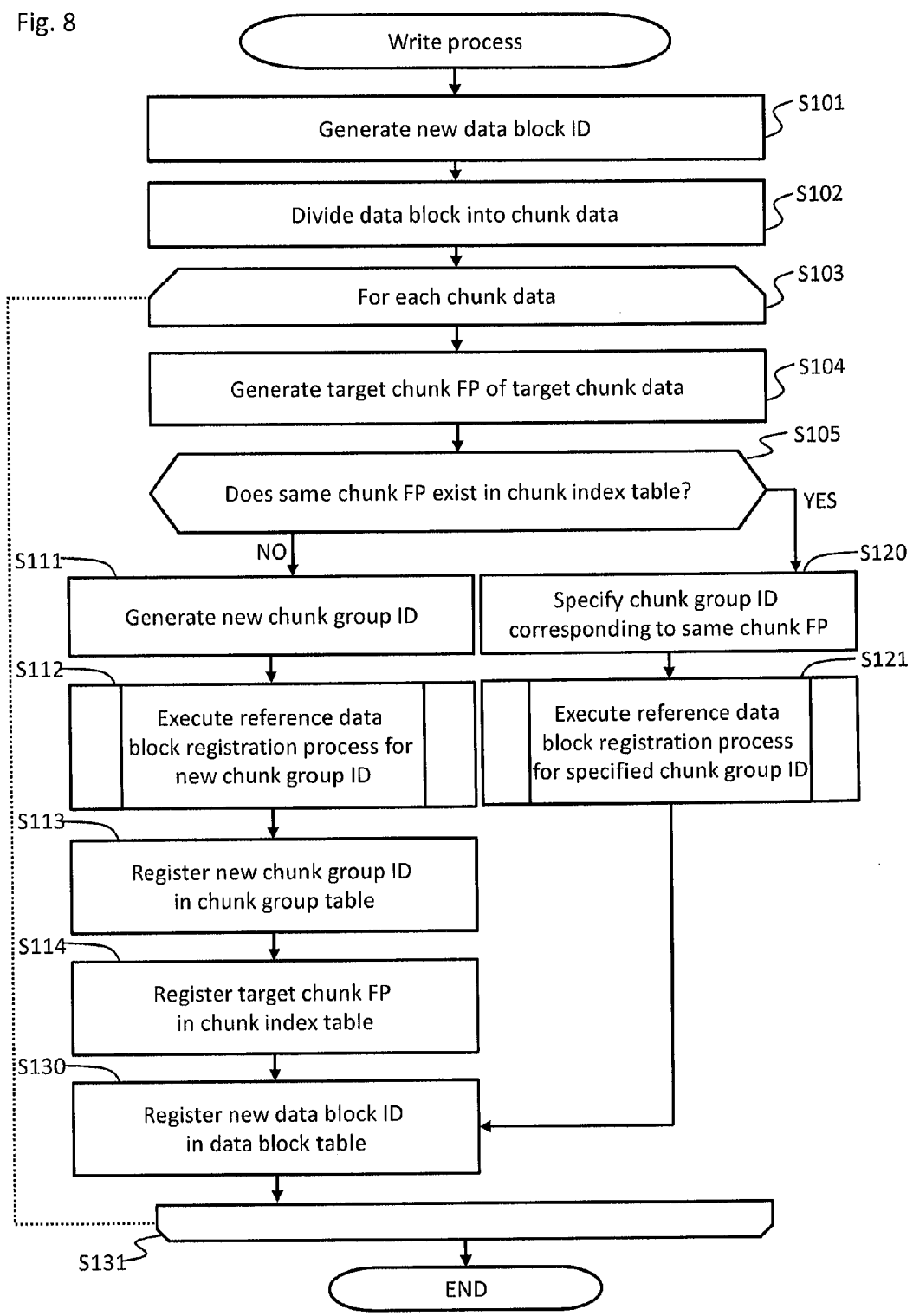
FIG. 8 is a flowchart illustrating an example of a data block write process.

FIG. 8 is a flowchart illustrating an example of a data block write process.

If the write processing unit 101 receives the data block 40 according to the write request from the client 11, the write processing unit 101 generates a data block ID corresponding to the data block 40 (S101).

The write processing unit 101 divides the data block 40 into one or more chunk data 41 (S102). In addition, the write processing unit 101 executes the processes of the following S103 to S131 for each divided chunk data 41 (S103). Here, the chunk data of each process target is referred to as the "target chunk data".

The write processing unit 101 generates the target chunk FP 42 from the target chunk data 41 (S104).

The write processing unit 101 determines whether the same chunk FP (261) as the target chunk FP 42 exist in the chunk index table 260 (S105).

First, the case in which the same chunk FP does not exist in the chunk index table 260 (S105: NO) will be described.

The write processing unit 101 generates a new chunk group ID (241) in the reference data block table 240 (S111).

The write processing unit 101 executes a reference data block registration process for the new chunk group ID as a target (S112). The reference data block registration process will be described in detail below (refer to FIG. 9).

The write processing unit 101 generates the record 230 in which the new chunk group ID (221), the target chunk FP (222), and the target chunk data (223) are associated with each other and registers the record in the chunk group table 220 (S113).

The write processing unit 101 generates the record 270 in which the target chunk FP (261) and the new chunk group ID (262) are associated with each other and registers the record in the chunk index table 260 (S114). In addition, the write processing unit 101 migrates to S130.

Next, the case in which the same chunk FP exists in the chunk index table 260 (S105: YES) will be described.

The write processing unit 101 specifies the chunk group ID (262) corresponding to the same chunk FP (261), in the chunk index table 260 (S120).

The write processing unit 101 executes the reference data block registration process for the specified chunk group ID (S121) as a target. The reference data block registration process will be described in detail below (refer to FIG. 9). In addition, the write processing unit 101 migrates to S130.

In S130, the write processing unit 101 registers the record 210 in which the data block ID (201) generated by S101, the new chunk group ID (202) according to S111 or the existing chunk group ID (202) according to S120, and the target chunk FP (203) generated by S104 are associated with each other, in the data block table 200 (S130).

After the write processing unit 101 completes the processes of S103 to S131 for all of the chunk data (S131), the write processing unit 101 ends this process (END).

By the processes described above, the controller 20 can reflect various information regarding the data block according to the write request in each table.

Figure 9:
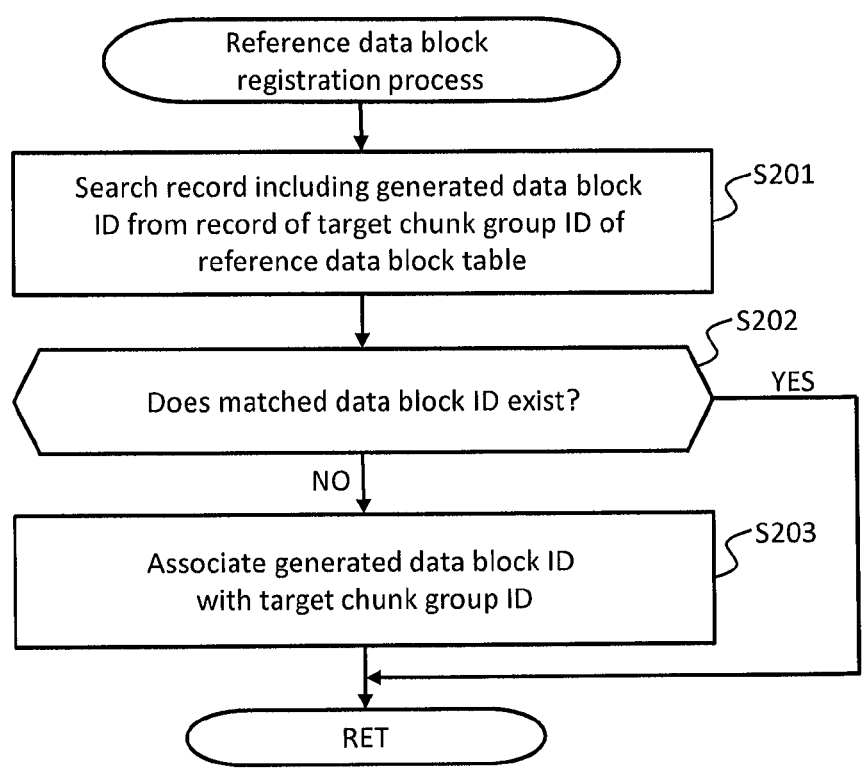
FIG. 9 is a flowchart illustrating an example of a reference data block registration process.

FIG. 9 is a flowchart illustrating an example of the reference data block registration process. This process corresponds to the process of S112 or S121 of FIG. 8.

The write processing unit 101 extracts the record 250 including the chunk group ID (241) targeted by S112 or S121 from the reference data block table 240 and searches the record 250 including the data block ID generated by S101 in the extracted record 250 (S201).

When the record 250 including the data block ID can be discovered in searching of S201 (S202: YES), the write processing unit 101 ends the process and returns to the process of FIG. 8 (RET). For example, in the processes of S103 to S131 after the second session in FIG. 8, the process (S202: YES) is executed.

When the record 250 including the data block ID cannot be discovered in searching of S201 (S202: NO), the write processing unit 101 generates the record 250 in which the target chunk group ID and the data block ID generated by S101 are associated with each other and registers the record in the reference data block table 240 (S203). In addition, the write processing unit 101 returns to the process of FIG. 8 (RET). For example, in the processes of S103 to S131 of the first session in FIG. 8, the process (S202: NO) is executed.

By the processes described above, in the reference data block table 240, the record 250 in which the target chunk group ID (240) and the new data block ID (242) are associated with each other is registered or updated.

Figure 10:
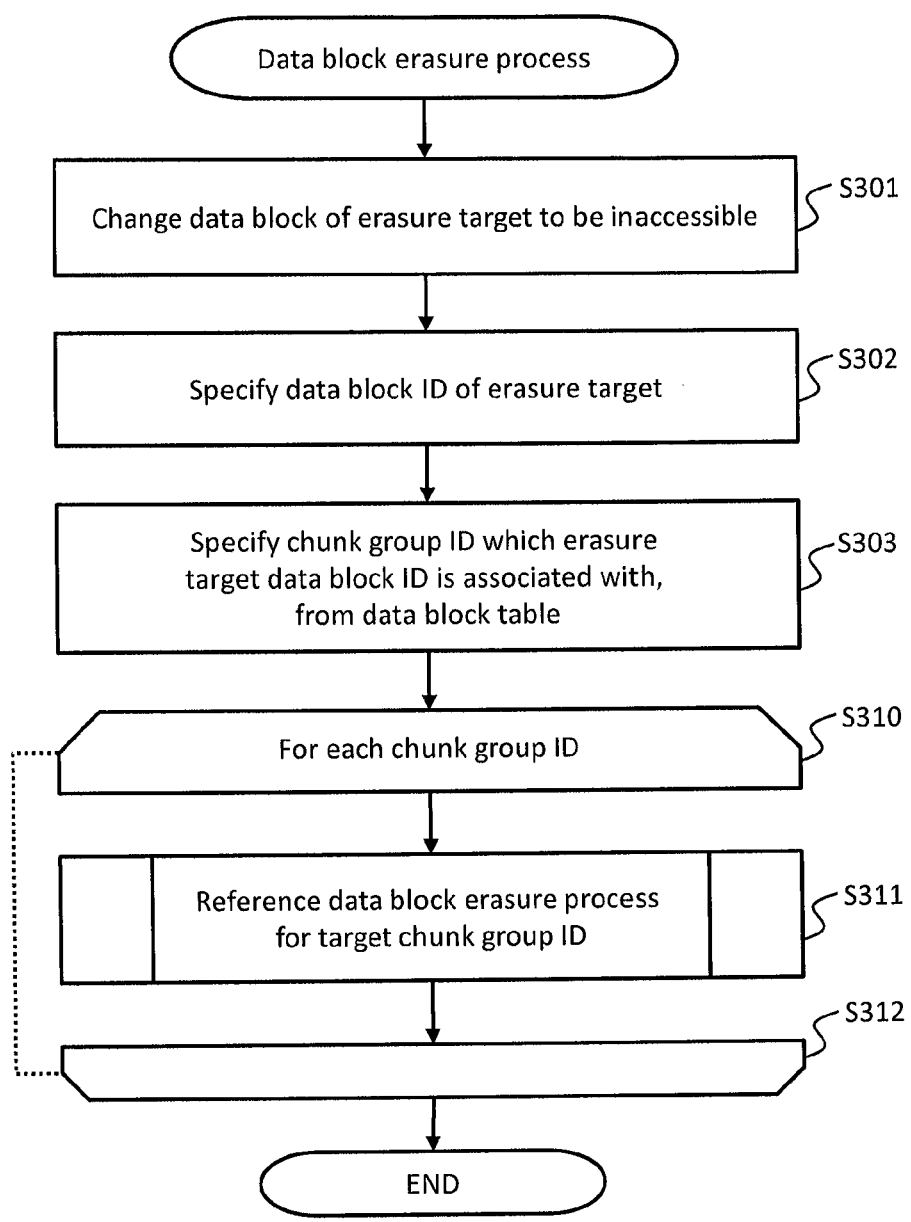
FIG. 10 is a flowchart illustrating an example of a data block erasure process.

FIG. 10 is a flowchart illustrating an example of the data block erasure process.

If the erasure processing unit 103 receives the erasure request of the certain data block 40 from the client 11, the erasure processing unit 103 changes the data block 40 of the erasure target to be inaccessible from the client 11 (S301).

The erasure processing unit 103 specifies the ID of the data block of the erasure target (S302). In addition, the erasure processing unit 103 refers to the data block table 200 and specifies one or more chunk group IDs (202) which the data block ID (201) of the erasure target is associated with (S303).

The erasure processing unit 103 executes the processes of S310 to S312 for each of one or more specified chunk group IDs (202) (S310). Hereinafter, the chunk group ID of each process target is referred to as the "target chunk group ID".

The erasure processing unit 103 executes the reference data block erasure process for the target chunk group ID (S311). The reference data block erasure process will be described in detail below (refer to FIG. 11).

After the erasure processing unit 103 completes the processes of S310 to S312 for all of the chunk group IDs specified by S303 (S312), the erasure processing unit 103 ends this process (END).

By the processes described above, the data block of the erasure target is erased from the drive 30. In addition, the association of the data block ID of the erasure target is erased in the reference data block table 240.

Figure 11:
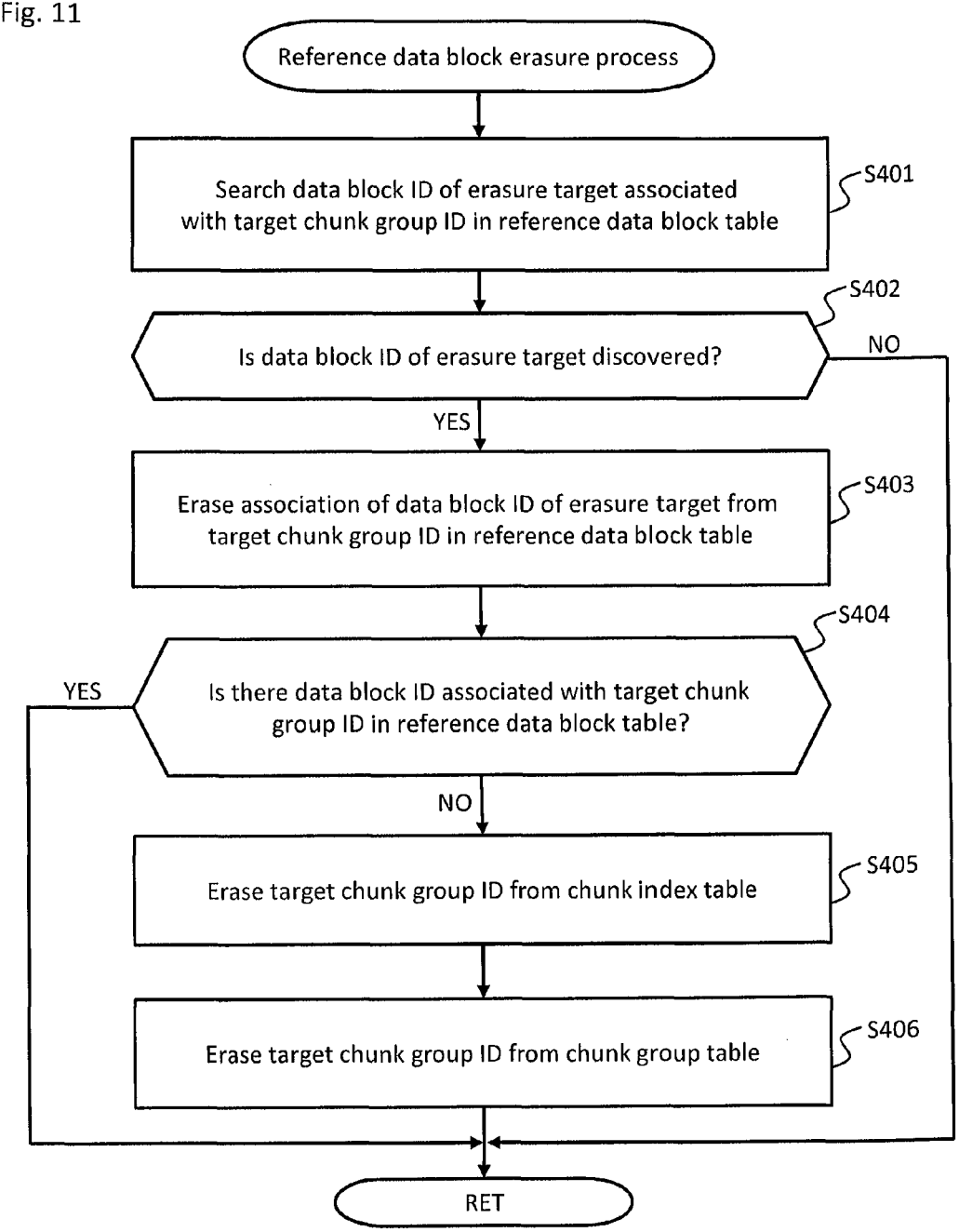
FIG. 11 is a flowchart illustrating an example of a reference data block erasure process.

FIG. 11 is a flowchart illustrating an example of the reference data block erasure process. This process corresponds to S311 of FIG. 10.

The erasure processing unit 103 searches the data block ID of the erasure target from one or more data block IDs (242) associated with the target chunk group IDs (241), in the reference data block table 240 (S401).

When the data block ID of the erasure target cannot be discovered in searching of S401 (S402: NO), the erasure processing unit 103 returns to the process illustrated in FIG. 10 (RET). This is because it can be confirmed that the data block ID of the erasure target is normally erased.

When the data block ID of the erasure target is discovered in searching of S401 (S402: YES), the erasure processing unit 103 migrates to the following S403.

That is, the erasure processing unit 103 erases the association of the discovered data block ID of the erasure target from the target chunk group ID (241) in the reference data block table 240 (S403).

The erasure processing unit 103 determines which data block ID (242) is associated with the target chunk group ID (241), in the reference data block table 240 (S404). For example, when the data block ID (242) associated with the target chunk table ID (241) is "NULL" in the reference data block table 240, the erasure processing unit 103 determines that there is no data block ID (242) associated with the target chunk table ID (241) (S404: NO).

When it is determined that there is a data block ID associated with the target chunk group ID (S404: YES), the erasure processing unit 103 returns to the process of FIG. 10 (RET). This is because the chunk data (chunk FP) belonging to the target chunk group ID cannot be erased.

When it is determined that there is no data block ID associated with the target chunk table ID (S404: NO), the erasure processing unit 103 executes the process of the following S405.

That is, the erasure processing unit 103 erases the record 270 including the target chunk group ID (262) from the chunk index table 260 (S405).

In addition, the erasure processing unit 103 erases the record 230 including the target chunk group ID (221) from the chunk group table 220 (S406) and returns to the process of FIG. 10 (RET). This is because all of the chunk data (chunk PFs) belonging to the target chunk group ID are not referred to from all of the data blocks and can be determined as erasable chunk data. By the processes described above, unnecessary chunk data can be erased from the drive 30.

Figure 12:
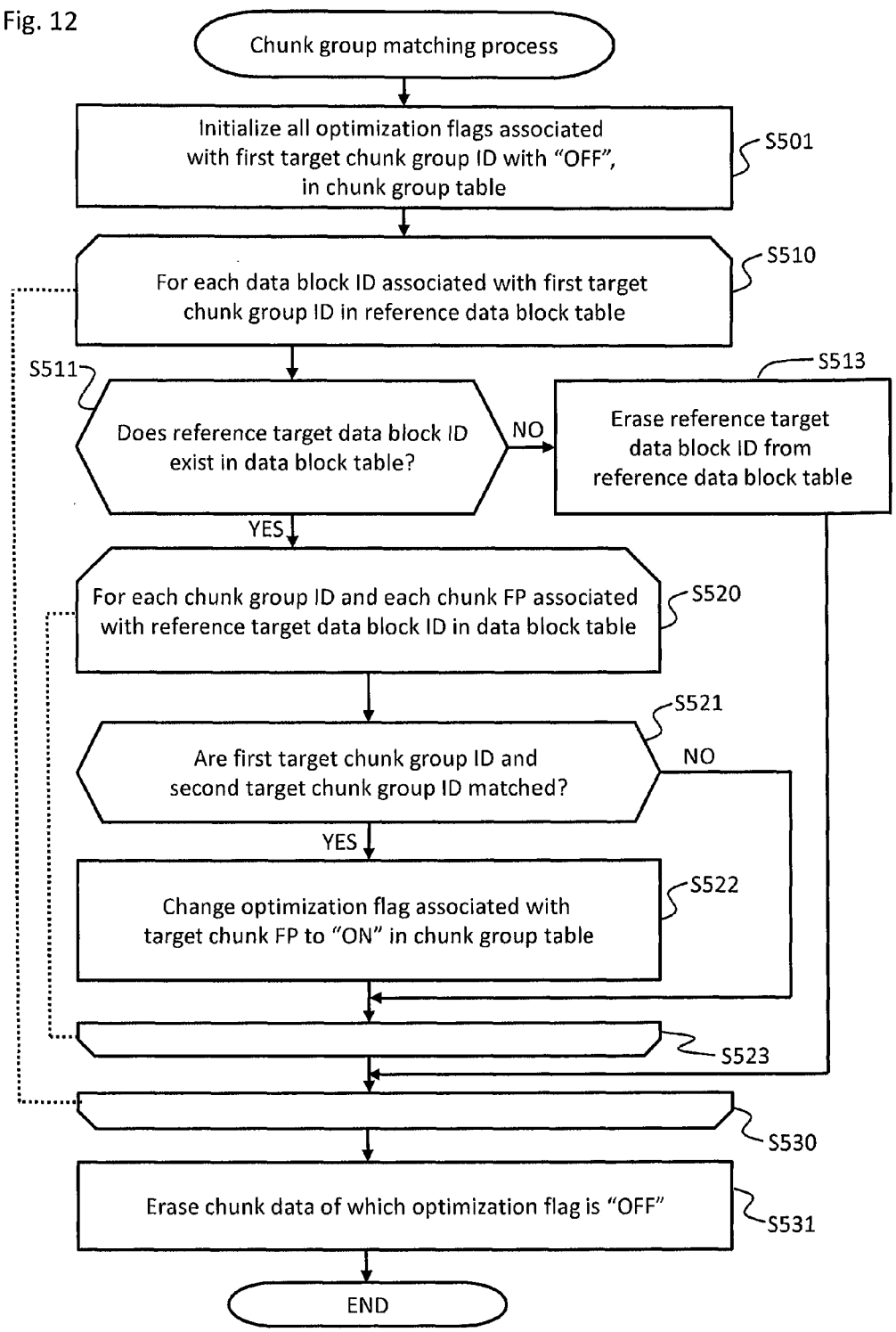
FIG. 12 is a flowchart illustrating an example of a chunk group optimization process.

FIG. 12 is a flowchart illustrating an example of the chunk group matching process.

The chunk group matching process may be executed when the storage system 10 starts, when an indication is received from a manager, when an obstacle occurs during the write process of the data block 40, when the number of data block IDs (242) in the reference data block table 240 in the reference data block table 240 is equal to or less than a threshold value, and at timing of a constant cycle.

FIG. 12 illustrates a flow when the chunk group ID (221) of 1 in the chunk group table 220 is configured as a process target. The chunk group ID of the process target is expressed as a "first target chunk group ID". Therefore, when the process is executed for all of the chunk group IDs (221) registered in the chunk group table 220, it is necessary to configure each chunk group ID (221) as the first target chunk group ID and sequentially execute the flow illustrated in FIG. 12.

The matching processing unit 104 initializes all of the optimization flags (224) associated with the first target chunk group ID (221) with "OFF", in the chunk group table 220 (S501).

The matching processing unit 104 sequentially executes S510 to S530 for each data block ID (242) associated with the first target chunk group ID (241) in the reference data block table 240 (S510). Here, the data block ID of each process target is expressed as a "reference target data block ID".

The matching processing unit 104 determines whether the same data block ID as the reference target data block ID exists in the data block table 200 (S511).

When the same data block ID as the reference target data block ID does not exist in the data block table 200 (S511: NO), the matching processing unit 104 erases the reference target data block ID (242) from the reference data block table 240 (S513) and migrates to S530. This is because the data block ID not existing in the data block table 200 and existing in only the reference data block table 240 is mismatching occurring due to interrupt of the erasure process and is a data block ID to be originally erased.

When the reference target data block ID exists in the data block table 200 (S511: YES), the matching processing unit 104 executes the following S520.

That is, the matching processing unit 104 sequentially executes S520 to S523 for the chunk group ID (202) and the chunk FP (203) associated with the reference target data block ID (201), in the data block table 200 (S520). Here, the chunk group ID (202) and the chunk PF (203) of each process target are expressed as the "second target chunk group ID" and the "second target chunk FP", respectively.

The matching processing unit 104 determines whether the first target chunk group ID and the second target chunk group ID are matched (S521).

When the first target chunk group ID and the second target chunk group ID are not matched (S521: NO), the matching processing unit 104 migrates to S523.

When the first target chunk group ID and the second target chunk group ID are matched (S521: YES), the matching processing unit 104 executes the following S522. That is, the matching processing unit 104 changes the optimization flag (224) associated with the target chunk FP (222) to "ON" in the chunk group table 220 (S522) and migrates to S523.

When S520 to S523 are completed for all of the chunk group IDs (202) associated with the reference target data block ID (201) in the data block table 200, the matching processing unit 104 migrates to the following S530 and when the non-processed chunk group ID (202) remains, the matching processing unit 104 returns to S520 (S523).

When the process is completed for all of the data block IDs (242) associated with the first target chunk group ID (241) in the reference data block table 200, the matching processing unit 104 migrates to the following S531 and when the non-processed data block ID remains, the matching processing unit 104 returns to S510 (S530).

The matching processing unit 104 erases the chunk data (223) corresponding to the chunk FP (222) of which the optimization flag (224) is "OFF" in the chunk group table 220 from the drive 30 (S531) and ends this process (END).

By the processes described above, unnecessary chunk data remaining in the drive 30 due to sudden power outage can be erased.

The embodiment of the present invention described above is an example to describe the present invention and a range of the present invention is not limited by only the embodiment. The present invention can be embodied in a variety of other aspects by those skilled in the art, without departing from the scope of the present invention.

This embodiment can be expressed as follows.

<Expression 1>

A storage system including:

a storage device; and a controller to control the storage device, wherein a plurality of chunk data to be constituent elements of a data block are stored in the storage device, and the controller prevents the same chunk data from being stored in the storage device in an overlapped manner, on the basis of data block information showing an association of each data block and a plurality of chunk data configuring each data block, chunk group information showing an association of each chunk data not to be overlapped and a chunk group which each chunk data belongs to, and reference data block information showing an association of each chunk group and a data block having any chunk data belonging to each chunk group as constituent elements.

<Expression 2>

The storage system according to expression 1, wherein the controller executes a first process for erasing a first data block from the data block information, erasing the association of the first data block from a first chunk group which the first data block is associated with, in the reference data block information, and erasing all chunk data belonging to the first chunk group specified on the basis of the chunk group information from the storage device, when there is no data block associated with the first chunk group.

<Expression 3>

The storage system according to expression 2, wherein the controller executes a second process for extracting a data block not included in the data block information from a plurality of data blocks included in the reference data block information and erasing the extracted data block from the association with the chunk group in the reference data block information.

<Expression 4>

The storage system according to expression 3, wherein the controller executes the second process, when the first process is interrupted.

<Expression 5>

The storage system according to expression 2, wherein the controller divides a data block of a write target into a plurality of chunk data, specifies a second chunk group which the same chunk data as second chunk data belongs to, on the basis of the chunk group information, for the same second chunk data as any chunk data included in the chunk group information in the plurality of divided chunk data, and associates the data block of the write target with the second chunk group in the reference data block information.

<Expression 6>

The storage system according to any one of expressions 2 to 5, wherein, in the case in which an erasure request of the first data block is received, in the first process, the controller erases the association of the first data block from the first chunk group which the first data block is associated with, in the reference data block information, and returns a response to the erasure request at timing when the first data block is erased from the data block information, without waiting for completion of a process for deleting all of the chunk data belonging to the first chunk group specified on the basis of the chunk group information from the storage device, when there is no data block associated with the first chunk group.

<Expression 7>

A storage control method of controlling a storage device by a controller, wherein a plurality of chunk data to be constituent elements of a data block are stored in the storage device, and the controller prevents the same chunk data from being stored in the storage device in an overlapped manner, on the basis of data block information showing an association of each data block and a plurality of chunk data configuring each data block, chunk group information showing an association of each chunk data not to be overlapped and a chunk group which each chunk data belongs to, and reference data block information showing an association of each chunk group and a data block having any chunk data belonging to each chunk group as constituent elements.

In the above expressions, the "storage device" corresponds to the drive 30, the "data block information" corresponds to the data block table 200 and the record 210 thereof, the "chunk group information" corresponds to the chunk group table 220 and the record 230 thereof, and the "reference data block information" corresponds to the reference data block table 240 and the record 250 thereof.

REFERENCE SIGNS LIST

10: storage system
11: client
20: controller
22: memory
30: drive
40: data block
41: chunk data
42: chunk FP (FingerPrint)
60: chunk group
200: data block table
220: chunk group table
240: reference data block table
260: chunk index table

The invention claimed is:

1. A storage system comprising:

a storage device; and a controller configured to control the storage device, wherein a plurality of chunk data to be constituent elements of a data block are stored in the storage device, and the controller prevents the same chunk data from being stored in the storage device in an overlapped manner, on the basis of data block information showing an association of each data block and a plurality of chunk data configuring each data block, chunk group information showing an association of each chunk data not to be overlapped and a chunk group which each chunk data belongs to, and reference data block information showing an association of each chunk group and a data block having any chunk data belonging to each chunk group as constituent elements, wherein the controller executes a first process for erasing a first data block from the data block information, erasing an association of the first data block from a first chunk group which the first data block is associated with, in the reference data block information, and erasing all chunk data belonging to the first chunk group specified on the basis of the chunk group information from the storage device, when there is no data block associated with the first chunk group, and wherein the controller executes a second process for extracting a data block not included in the data block information from a plurality of data blocks included in the reference data block information and erasing the extracted data block from the association with the chunk group in the reference data block information.

2. The storage system according to claim 1, wherein the controller executes the second process, when the first process is interrupted.

3. The storage system according to claim 2, wherein, in the case in which an erasure request of the first data block is received, in the first process, the controller erases the association of the first data block from the first chunk group which the first data block is associated with, in the reference data block information, and returns a response to the erasure request at timing when the first data block is erased from the data block information, without waiting for completion of a process for deleting all of the chunk data belonging to the first chunk group specified on the basis of the chunk group information from the storage device, when there is no data block associated with the first chunk group.

* * * * *